United States Patent
Anderson et al.

(10) Patent No.: US 7,266,103 B2
(45) Date of Patent: Sep. 4, 2007

(54) CONTROLLING FORWARD LINK TRAFFIC CHANNEL POWER

(75) Inventors: Jon J. Anderson, Boulder, CO (US); Durga P. Malladi, San Diego, CA (US); Steven J. Doerfler, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1030 days.

(21) Appl. No.: 10/267,289

(22) Filed: Oct. 8, 2002

(65) Prior Publication Data

US 2003/0081573 A1    May 1, 2003

Related U.S. Application Data

(60) Provisional application No. 60/335,749, filed on Oct. 25, 2001.

(51) Int. Cl.
*H04B 7/216*    (2006.01)
*H04Q 7/00*    (2006.01)

(52) U.S. Cl. .................. 370/335; 455/515; 455/522

(58) Field of Classification Search ............. 370/333, 370/335, 320, 342, 441, 332, 209, 208, 316, 370/318, 229; 445/520
See application file for complete search history.

(56) References Cited

U.S. PATENT DOCUMENTS 5,907,809 A * 5/1999 Molnar et al. ............ 455/456.2
6,240,124 B1 * 5/2001 Wiedeman et al. ......... 375/130
6,320,855 B1 * 11/2001 Shi ........................... 370/332
6,574,211 B2 * 6/2003 Padovani et al. ........... 370/347
6,724,737 B1 * 4/2004 Boyden et al. ............. 370/316
2003/0083089 A1 * 5/2003 Malladi ..................... 455/522
2006/0203731 A1 * 9/2006 Tiedemann et al. ........ 370/235

FOREIGN PATENT DOCUMENTS

EP    1091506 A    4/2001

OTHER PUBLICATIONS

Payne J. et al., "IS-95 CDMA forward link optimization tool" Radio and Wireless Conference, 1998. Rawcon 98. Aug. 9, 1998, pp. 185-188.

* cited by examiner

*Primary Examiner*—Chau Nguyen
*Assistant Examiner*—Hicham B Foud
(74) *Attorney, Agent, or Firm*—Gregory Ogrod; Ashish Patel; Thomas Rouse (57) ABSTRACT

Forward link transmission power to a user terminal in a wireless communications system having a plurality of beams is controlled by determining a baseline power level, $P_{baseline}$, from a received active pilot channel signal-to-noise ratio (SNR); determining a power margin, $P_{margin}$, from an identified interference susceptibility; determining a power level correction, $P_{correction}$, based on an identified packet error rate (PER); and setting $P_{transmit}$ based on $P_{baseline}$, $P_{margin}$, and $P_{correction}$. For example, $P_{transmit}$ may be set to a power level that is substantially equal to the sum of $P_{baseline}$, $P_{margin}$, and $P_{correction}$. The determination of each of $P_{baseline}$, $P_{margin}$, and $P_{correction}$ may be performed in independently running control loops or processes.

24 Claims, 8 Drawing Sheets

CONTROLLING FORWARD LINK TRAFFIC CHANNEL POWER

RELATED APPLICATIONS

This application claims priority from U.S. Provisional Patent Application entitled "System And Method For Controlling Forward Link Traffic Channel Power," Ser. No. 60/335,749, filed Oct. 25, 2001, which application is incorporated herein by reference in its entirety.

BACKGROUND OF THE INVENTION

I. Field of the Invention

The present invention generally relates to wireless communications networks. More particularly, the present invention relates to methods and apparatus for controlling transmission power.

II. Background Art

There are a variety of wireless communication systems having multiple beam communication links. A satellite-based communication system is one such example. Another example is a cellular communication system.

A satellite-based communication system includes one or more satellites to relay communications signals between gateways and user terminals. Gateways provide communication links for connecting a user terminal to other user terminals or users of other communications systems, such as a public switched telephone network (PSTN). User terminals can be fixed or mobile, such as a mobile telephone, and positioned near a gateway or remotely located.

A satellite can receive signals from and transmit signals to a user terminal provided the user terminal is within the "footprint" of the satellite. The footprint of a satellite is the geographic region on the surface of the earth covered by the satellite communications system. In some satellite systems, a satellite's footprint is geographically divided into "beams," through the use of beam forming antennas. Each beam covers a particular geographic region within a satellite's footprint.

Some satellite communications systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,174, which issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

The method for providing CDMA mobile communications was standardized in the United States by the Telecommunications Industry Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000UM, or International Mobile Telecommunications System 2000/Universal Mobile Telecommunications System, standards covering what are referred to as wideband CDMA (WCDMA), cdma2000 (such as cdma2000 1×or 3×standards, for example) or TD-SCDMA.

Cellular communications may also employ CDMA techniques. However, instead of receiving signals from gateways that are relayed through one or more satellites, user terminals receive signals from a fixed position base station that supports multiple sectors, each corresponding to a particular geographic region, similar to having multiple beams.

Gateways and base stations transmit information in the form of wireless signals to user terminals across forward link communications channels. These wireless signals need to be transmitted at power levels sufficient to overcome noise and interference so that the transfer of information occurs within specified error rates. In addition, these wireless signals need to be transmitted at power levels that are not excessive so that they do not interfere with communications involving other user terminals. Faced with this challenge, gateways and base stations employ dynamic forward link power control techniques to establish appropriate forward link transmit power levels.

Conventional forward link power control techniques involve closed loop approaches where user terminals provide gateways and base stations with feedback that specifies particular forward link transmit power adjustments. For example, one such approach involves a user terminal determining signal-to-noise ratios (SNRs) of received forward link traffic signals. Based on these determined SNRs, the user terminal transmits commands that direct the gateway or base station to either increase or decrease the transmit power of traffic signals sent to the user terminal.

These commands are referred to as up/down commands because they direct either a power increase or a power decrease. Up/down commands are transmitted to the gateway or base station across an up/down power control channel. This channel is typically implemented by "puncturing" the up/down commands into frames of user terminal data that are transmitted to the gateway or base station. This puncturing can limit the data rates at which user terminals transmit information to gateways and base stations. Additionally, punctured channels may not be as reliable because punctured commands may introduce a higher bit error rate for a given signal-to-noise ratio.

In addition to transmitting up/down commands, user terminals typically transmit other types of information to gateways and base stations. For example, many user terminals periodically transmit various power measurements and noise measurements to support operations, such as "handoffs" between beams during an active call. To eliminate the less reliable transmission of data rate limiting power adjustment commands, it is desirable for gateways and base stations to utilize such transmitted measurements to control forward link transmit power levels.

In addition, it is desirable to conserve forward link transmission power. Since satellite and cellular communications systems employ multiple beams, transmissions received by user terminals in a particular beam are susceptible to interference from transmissions designated for neighboring beams. A user terminal's interference susceptibility is related to its proximity to adjacent beams. Namely, the closer a user or user terminal is to an adjacent beam, the more susceptible the user is to interference from neighboring beams.

In a satellite-based communications system where the satellites are not stationary, the geographic area covered by a given satellite is constantly changing. As a result, a user terminal positioned within a particular beam of a particular satellite at one point in time can later be positioned within a different beam of the same satellite and/or within a different beam of a different satellite. Furthermore, because satellite communication is wireless, a user terminal is free to move about. As a result, user terminals typically have varying positions within a beam while receiving transmissions across forward link channels. Accordingly, their susceptibility to interference may vary over time.

One technique for reducing interference received by user terminals is to boost the power of signals that are transmitted by satellites and/or cellular base stations to user terminals by a fixed margin. However, since user terminals can experience varying degrees of interference susceptibility, this approach has the drawback of wasting power on users that are not as susceptible to interference as others. In addition, this approach can cause additional interference with other user terminals.

Accordingly, as with the elimination of user terminals needing to transmit closed loop power adjustment commands, techniques for reducing interference while conserving transmit power are desirable, especially in systems having limited power budgets.

BRIEF SUMMARY OF THE INVENTION

The present invention is directed to apparatus and methods for controlling forward link transmission power, $P_{transmit}$, to a user terminal in a wireless communications system having a plurality of beams. The systems and methods determine a baseline power level, $P_{baseline}$, from a received active pilot channel signal-to-noise ratio (SNR); determine a power margin, $P_{margin}$, from an identified interference susceptibility; determine a power level correction, $P_{correction}$, based on an identified packet error rate (PER); and set $P_{transmit}$ based on $P_{baseline}$, $P_{margin}$, and $P_{correction}$. For example, $P_{transmit}$ may be set to a power level that is substantially equal to the sum of $P_{baseline}$, $P_{margin}$, and $P_{correction}$. The determination of each of these components may be performed using independently running control loops or processes.

Determining $P_{baseline}$ may include calculating a power level offset, $P_o$, and adding $P_o$ to a pilot channel transmit power level. Identifying a user terminal interference susceptibility may include receiving from the user terminal a plurality of signal power measurements.

Determining a power level correction, $P_{correction}$, may include identifying a packet error rate (PER) associated with a user terminal Determining $P_{correction}$ may include increasing $P_{correction}$ when the identified PER is greater than a desired PER, and decreasing $P_{correction}$ when the identified PER is less than the desired PER.

Each of these signal power measurements corresponds to one of a plurality of beams. For example, these measurements may be pilot signal power measurements conveyed in a pilot strength measurement message (PSMM). Alternatively, these measurements may be conveyed using other types of signals such as a paging message. The differences between a first of the signal power measurements, (such as one corresponding to the active beam, or the strongest measurement) and each of the other signal power measurements are calculated.

$P_{margin}$ is set to a first power level when the smallest of the calculated differences is greater than a predetermined threshold. Alternatively, $P_{margin}$ is set to a second power level when the smallest of the calculated differences is less than or equal to the predetermined threshold. This first power level is less than the second power level.

Identifying a user terminal interference susceptibility may alternatively include determining the location of the user terminal within one of the plurality of beams. In this case, $P_{margin}$ is set to a first power level when the identified location is within a beam crossover region. Otherwise, $P_{margin}$ is set to a second power level when the identified location is within a beam central region. Here, the first power level is greater than the second power level.

A system for controlling $P_{transmit}$ includes a selector that determines $P_{baseline}$, $P_{margin}$, and $P_{correction}$. A transceiver sets $P_{transmit}$ based on $P_{baseline}$, $P_{margin}$, and $P_{correction}$. For example, by setting $P_{transmit}$ to a power level that is substantially equal to the sum of $P_{baseline}$, $P_{margin}$, and $P_{correction}$ An advantage of the present invention is that it eliminates the need for closed loop forward link power control techniques where user terminals transmit commands that specify particular forward link transmit power adjustments.

Another advantage of the present invention is that it keeps interference levels within acceptable ranges, while conserving transmit power.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF EMBODIMENTS OF THE INVENTION

I. Exemplary Operational Environment

Figure 1:
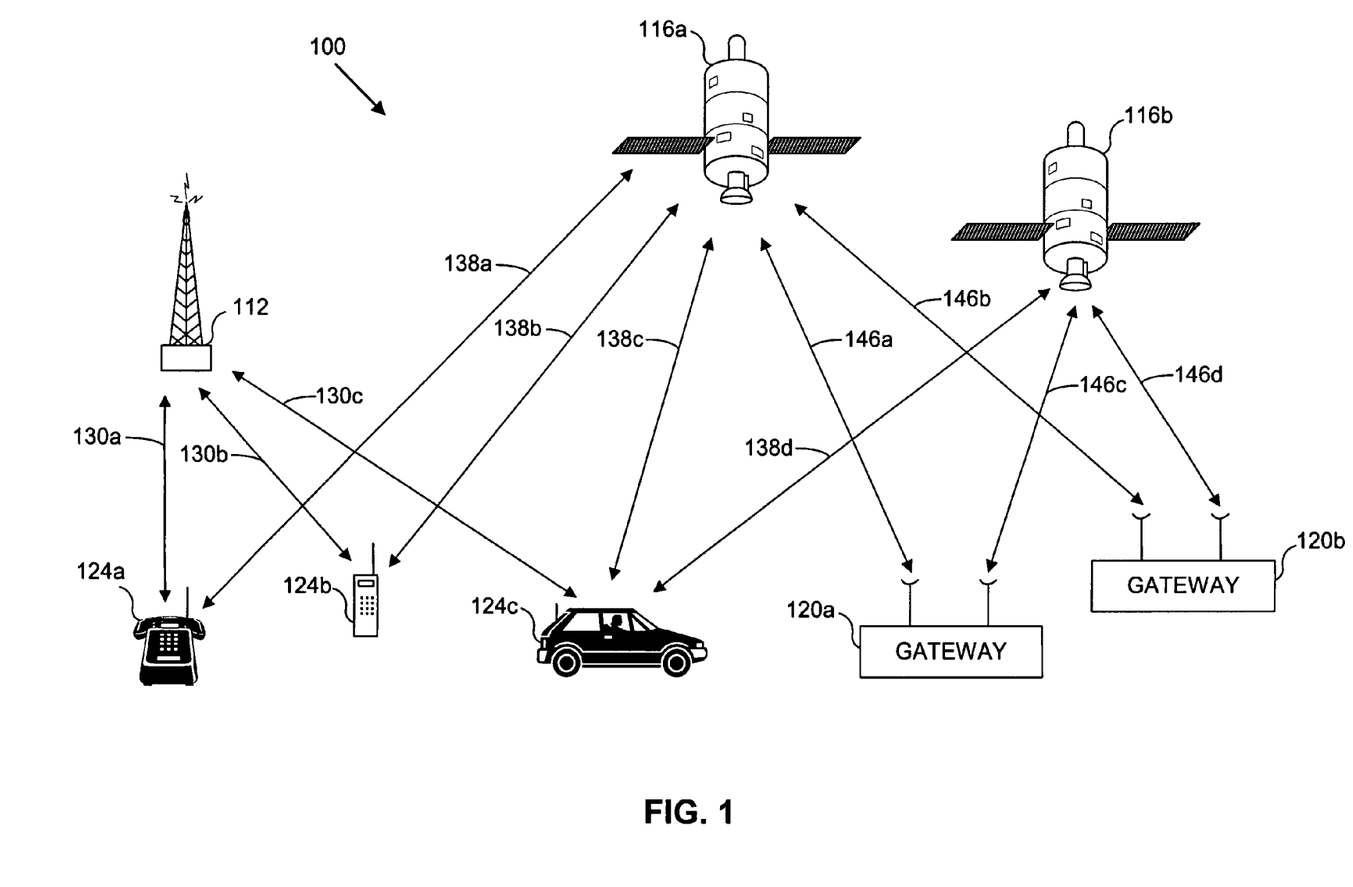
FIG. 1 illustrates an exemplary wireless communication system.

Before describing embodiments of the invention in detail, it is helpful to describe an example environment in which the invention may be implemented. The present invention is particularly useful in mobile communications environments. FIG. 1 illustrates such an environment.

FIG. 1 is a block diagram of an exemplary wireless communication system (WCS) 100 that includes a base station 112, two satellites 116a and 116b, and two associated gateways (also referred to herein as hubs) 120a and 120b. These elements engage in wireless communications with user terminals 124a, 124b, and 124c. Typically, base stations and satellites/gateways are components of distinct terrestrial and satellite based communication systems. However, these distinct systems may interoperate as an overall communications infrastructure.

Although FIG. 1 illustrates a single base station 112, two satellites 116, and two gateways 120, any number of these elements may be employed to achieve a desired communications capacity and geographic scope. For example, an exemplary implementation of WCS 100 includes 48 or more satellites, traveling in eight different orbital planes in Low Earth Orbit (LEO) to service a large number of user terminals 124.

The terms base station and gateway are also sometimes used interchangeably, each being a fixed central communication station, with gateways, such as gateways 120, being perceived in the art as highly specialized base stations that direct communications through satellite repeaters while base stations (also sometimes referred to as cell-sites), such as base station 112, use terrestrial antennas to direct communications within surrounding geographical regions. However, the invention is not limited to multiple access communication systems, and may be employed in other types of systems that employ other access techniques.

In this example, user terminals 124 each have or include apparatus or a wireless communication device such as, but not limited to, a cellular telephone, wireless handset, a data transceiver, or a paging or position determination receiver. Furthermore each of user terminals 124 can be hand-held, portable as in vehicle mounted (including cars, trucks, boats, trains, and planes) or fixed, as desired. For example, FIG. 1 illustrates user terminal 124a as a fixed telephone, user terminal 124b as a hand-held device, and user terminal 124c as a vehicle-mounted device. Wireless communication devices are also sometimes referred to as user terminals, mobile stations, mobile units, subscriber units, mobile radios or radiotelephones, wireless units, terminals, or simply as 'users,' subscribers, and 'mobiles' in some communication systems, depending on preference.

User terminals 124 engage in wireless communications with other elements in WCS 100 using code division multiple access (CDMA) techniques. However, the present invention may be employed in systems that employ other communications techniques, such as time division multiple access (TDMA), and frequency division multiple access (FDMA), or other waveforms or techniques listed above (WCDMA, CDMA2000. . . ).

Generally, beams from a beam source, such as base station 112 or satellites 116, cover different geographical areas in predefined patterns. Beams at different frequencies, also referred to as CDMA channels, frequency division multiplexed (FDM) signals or channels, or 'sub-beams,' can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

FIG. 1 illustrates several exemplary signal paths. For example, signal paths 130a-c provide for the exchange of signals between base station 112 and user terminals 124. Similarly, signal paths 138a-d provide for the exchange of signals between satellites 116 and user terminals 124. Communications between satellites 116 and gateways 120 are facilitated by signal paths 146a-d.

User terminals 124 are capable of engaging in bi-directional communications with base station 112 and/or satellites 116 across various channels. These communications are carried across one or more forward link channels and one or more reverse link channels. These channels convey radio frequency (RF) signals across signal paths 130, 138, and 146.

Forward link channels transfer information to user terminals 124. For example, forward link traffic channels convey signals carrying information, such as digitally encoded voice and data. To receive and process this information, a user terminal 124 needs to acquire the forward link traffic channel timing. This timing acquisition is performed through the reception of a corresponding forward link pilot channel that conveys a pilot signal.

FIG. 1 illustrates several exemplary forward and reverse link channels. A forward link traffic channel conveys information signals from base station 112 to user terminal 124a. User terminal 124a acquires the timing of forward link traffic channel through the reception of pilot signals by base station 112 on a forward link pilot channel. Both traffic channel and pilot channel signals are transferred over signal path 130a (not shown). Similarly, a reverse link traffic channel conveys information signals from user terminal 124a to base station 112 over signal path 130a (not shown).

Within the context of satellite-based communications involving user terminal 124c, satellite 116a, and gateway 120a, a forward link traffic channel, a forward link pilot channel, and a reverse link traffic channel transfer signals over signal paths 146a and 138c (not shown). Thus, terrestrial-based links typically involve a single wireless signal path between the user terminal and base station, while satellite-based links typically involve two, or more, wireless signal paths between the user terminal and a gateway through at least one satellite (ignoring multipath).

As described above, WCS 100 performs wireless communications according to CDMA techniques. Thus, signals transmitted across the forward and reverse links of signal paths 130, 138, and 146 convey signals that are encoded, spread, and channelized according to CDMA transmission standards. In addition, block interleaving may be employed across these forward and reverse links. These blocks are transmitted in frames (also referred to herein as packets) having a predetermined duration, such as 20 milliseconds.

Base station 112, satellites 116, and gateways 120 may adjust the power of the signals that they transmit across the forward link traffic channels of WCS 100. This power (referred to herein as forward traffic channel transmit power) may be varied according to commands, requests, or feedback from user terminal 124, or according to time. This time varying feature may be employed on a periodic basis. For example, this feature may be employed on a frame-by-frame basis. Alternatively, this feature may be employed on other time boundaries that are either larger or smaller than a frame. Such power adjustments are performed to maintain forward link bit error rates (BER) and/or packet error rates (PER) within specific requirements, reduce interference, and conserve transmission power.

For example, gateway 120a, through satellite 116a, may transmit forward link traffic channel signals to user terminal 124b at a different transmit power than it does for user terminal 124c. Additionally, gateway 120a may vary the forward traffic channel transmit power of each of the forward links to user terminals 124b and 124c for each successive frame.

As described above, pilot signals provide timing and phase references for corresponding traffic signals. These timing references include a phase reference of codes that enables user terminals 124 to become synchronized with the spreading and channelizing functions performed by gateways 124 and base station 112. In addition, this phase reference allows user terminals 124 to coherently demodulate received traffic signals.

WCS 100 may feature different communications offerings across these forward links, such as low data rate (LDR) and high data rate (HDR) services. An exemplary LDR service provides forward links having data rates from 3 kilobits per second (kbps) to 9.6 kbps, while an exemplary HDR service supports typical data rates as high as 604 kbps or more.

HDR service may be bursty in nature. That is, traffic transferred across HDR links may suddenly begin and end in an unpredictable fashion. Thus, in one instant, an HDR link may be operating at zero kbps, and in the next moment operating at a very high data rate, such as 604 kbps.

Figure 2:
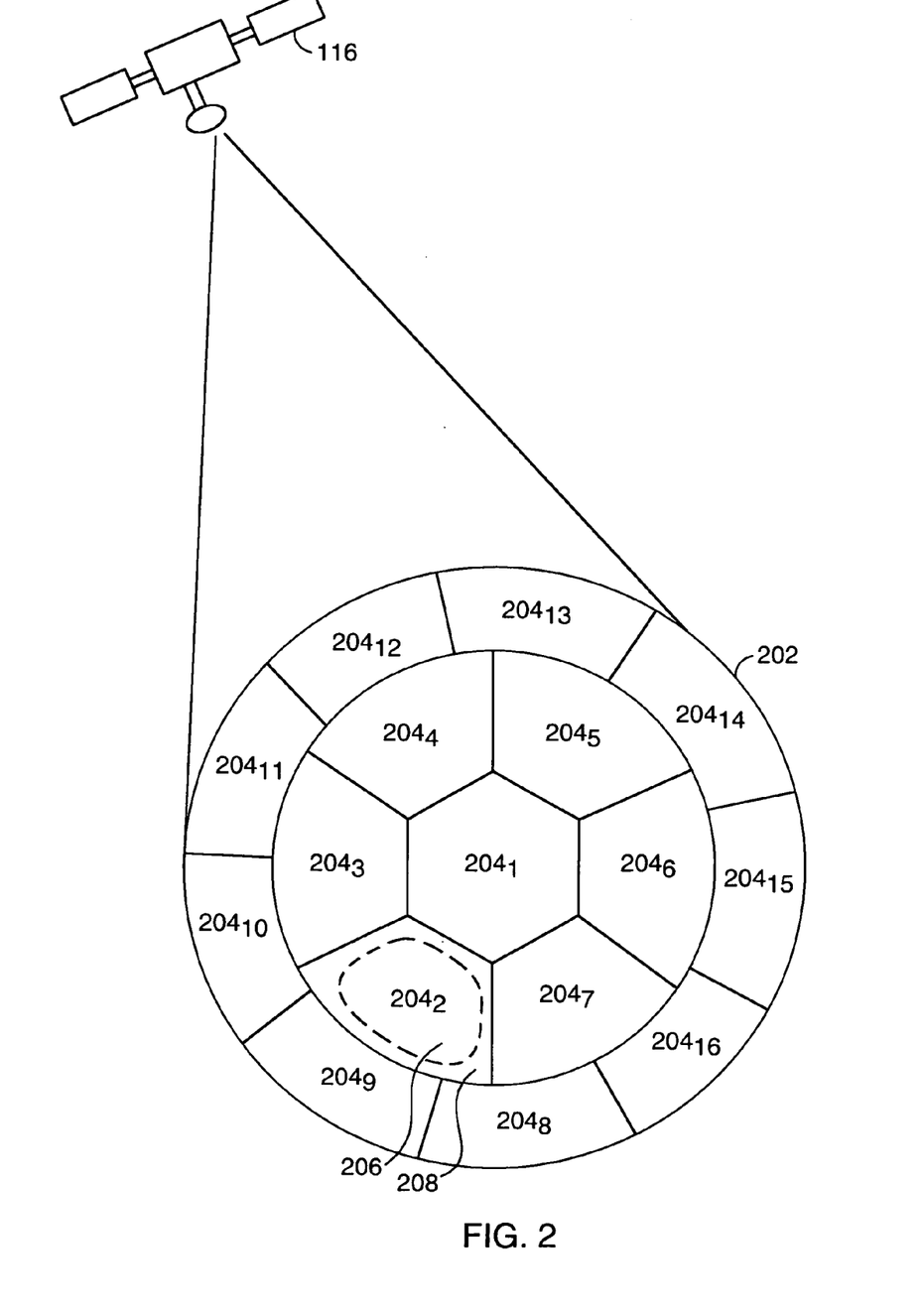
FIG. 2 illustrates an exemplary footprint having a plurality of beams.

FIG. 2 illustrates an exemplary satellite beam pattern 202, also known as a footprint. As shown in FIG. 2, the exemplary satellite footprint 202 includes sixteen beams $204_1$-$204_{16}$. Each beam covers a specific geographical area, although there usually is some beam overlap. The satellite footprint shown in FIG. 2 includes an inner beam (beam $204_1$), middle beams (beams $204_2$-$204_7$), and outer beams (beams $204_8$-$204_{16}$). Beam pattern 202 is a configuration of particular predefined gain patterns that are each associated with a particular beam 204.

Beams 204 are illustrated as having non-overlapping geometric shapes for purposes of illustration only. In fact, beams 204 each have gain pattern contours that extend well beyond the idealized boundaries shown in FIG. 2. However, these gain patterns are attenuated beyond these illustrated boundaries such that they do not typically provide significant gain to support communications with user terminals 124 outside of a given "boundary".

Beams 204 may each be considered to have different regions based on their proximity to one or more other beams and/or position within other beam gain patterns. For example, FIG. 2 illustrates beam $204_2$ having a central region 206 and a crossover region 208. Crossover region 208 includes portions of beam $204_2$ that are in close proximity to beams $204_1$, $204_3$, $204_7$, $204_8$, $204_9$, and $204_{10}$. Because of this proximity, user terminals 124 within crossover region 208 (as well as similar regions in other beams) are more likely to handoff to an adjacent beam, than are user terminals 124 in central region 206. However, user terminals 124 within handoff probable regions, such as crossover region 208, are also more likely to receive interference from communications links in adjacent beams 204.

Figure 3:
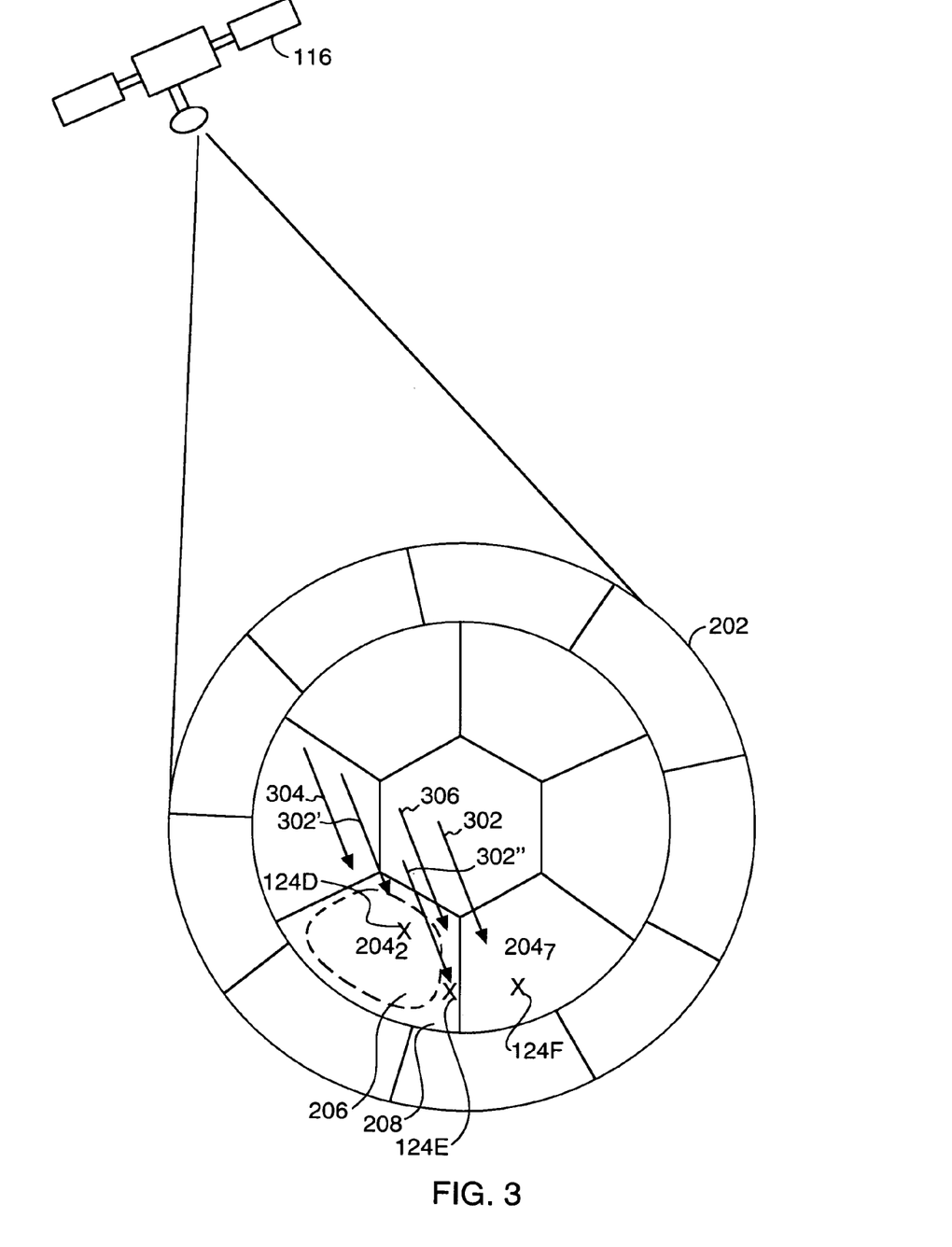
FIG. 3 illustrates an operational scenario within a satellite footprint.

To illustrate this principle, FIG. 3 shows an exemplary operational scenario within footprint 202. This operational scenario involves user terminals 124d-f communicating through different beams of a satellite 116. In particular, user terminals 124d and 124e are communicating with satellite 116 through beam $204_2$, while user terminal 124f is communicating with satellite 116 through beam $204_7$. As shown in FIG. 3, user terminal 124d is within central region 206 of beam $204_2$ and user terminal 124e is within crossover region 208 of beam $204_2$.

As described above, crossover region 208 is closer to beam $204_7$ than is central region 206. Because of this proximity, user terminal 124e within crossover region 208 can be within a higher gain portion of the beam $204_7$ gain pattern than can user terminal 124d within central region 206. For instance, in the operational scenario of FIG. 3, user terminal 124f receives a forward link transmission 302 from satellite 116. In addition, user terminals 124d and 124e receive this transmission as attenuated transmissions 302' and 302". Although both are weaker than transmission 302, transmission 302" is stronger than transmission 302'.

In addition to receiving these attenuated transmissions, user terminals 124d and 124e also receive forward link transmissions from satellite 116 that are intended for their reception. In particular, user terminal 124d receives a forward link transmission 304 from satellite 116 and user terminal 124e receives a forward link transmission 306 from satellite 116.

In the context of exemplary WCS 100, downlink CDMA transmissions within a particular beam 204 are orthogonally encoded. That is, they are not generally interfering with each other. However, downlink CDMA transmissions from different beams are not necessarily orthogonal, and may interfere with each other. Thus, in the operational scenario of FIG. 3, the reception of transmission 304 is susceptible to interference from transmission 302'. Similarly, the reception of transmission 306 is susceptible to interference from transmission 302".

II. Power Control Architecture

Communications systems, such as WCS 100, specify certain maximum BERs and/or PERs for signals transmitted across their wireless communications channels as being useful for desired link quality of service (QoS). For a channel to perform as intended, these error rates must not be exceeded, at least not for an appreciable amount of time. A channel's error rates depend on a ratio of power levels that is referred to herein as a signal-to-noise ratio (SNR). This ratio is expressed below in Equation (1).

$$\frac{E_b}{N_t} \qquad (1)$$

In Equation (1), $E_b$ represents the energy per transmitted bit and $N_t$ represents a noise energy. $N_t$ includes two components: $N_0$ and $I_t$. $N_o$ represents thermal noise and $I_t$ represents interference power.

$N_o$ is relatively constant in wireless communications environments, such as the environment of WCS 100. However, $I_t$ can vary greatly. Since $I_t$ can vary greatly, the ratio of Equation (1), as well as the associated link error rates, can fluctuate across a large range of values.

Error rates, such as BER and PER, are functions of SNR. Namely, as SNR increases, these error rates decrease. Therefore, increasing $E_b$ by boosting the power of signals transmitted across a forward link channel is one way to keep error rates beneath specified maximum levels. Unfortunately, wireless communications systems, such as WCS 100, include components, such as satellites 116, that have limited available transmit power. The present embodiment efficiently allocates this available power to multiple traffic channels.

Figure 4:
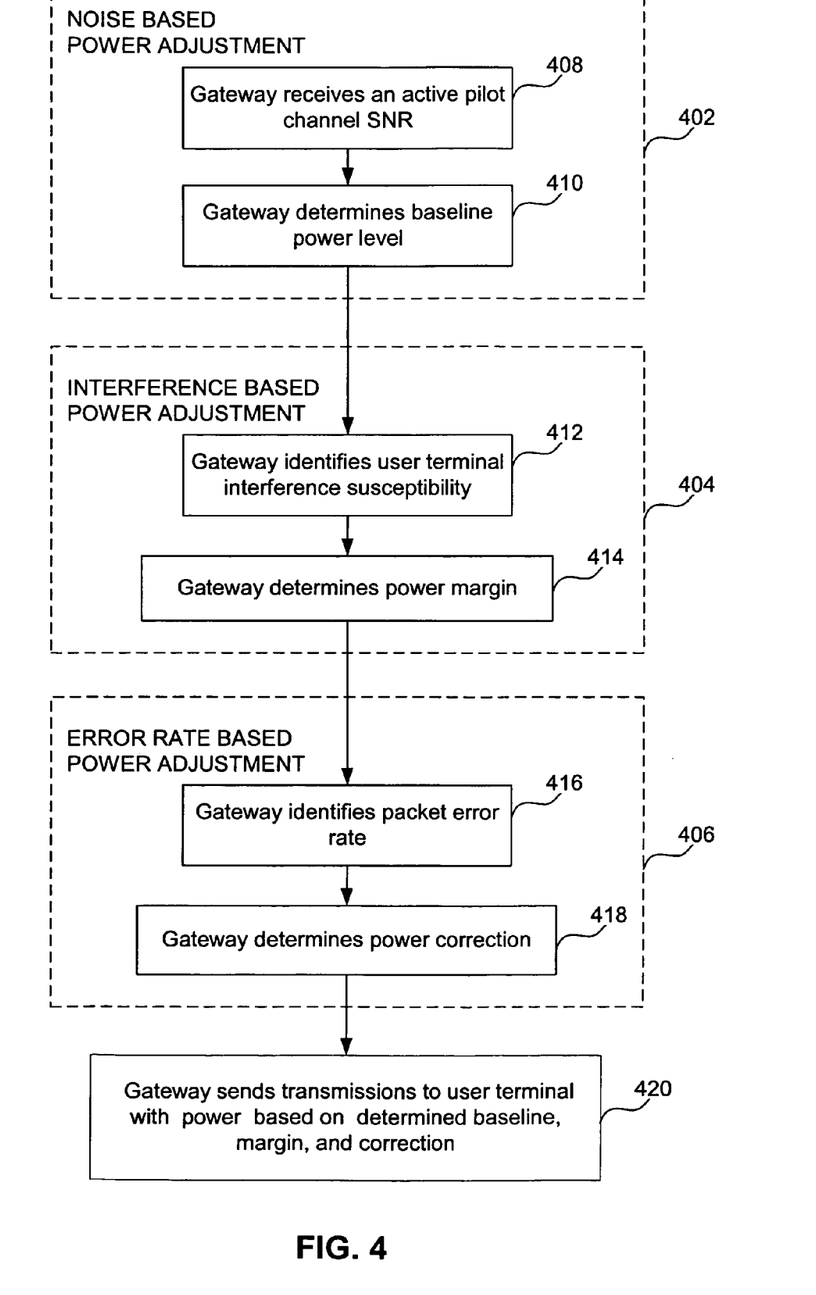
FIGS. 4-6 are flowcharts illustrating operational sequences of an embodiment.

This provides a power control architecture that efficiently allocates transmit power to communications channels, such as forward link traffic channels. FIG. 4 is a flowchart illustrating an operation according to this architecture. This operation is described in the context of forward link traffic channel communications from gateway 120a to user terminal 124a. However, this operation may be applied to communications between a variety of user terminals 124 and gateways 120 or base stations 112.

As described above, conventional techniques for forward link power control involve closed loop approaches where user terminals provide gateways or base stations with commands, such as up/down commands, that specify particular forward link traffic channel power adjustments. Such commands are typically transmitted across a reverse link up/down command channel. The power control architecture of FIG. 4 advantageously eliminates the need for such channels.

In a step 402, gateway 120a performs a noise based power control. As shown in FIG. 4, step 402 includes steps 408 and 410. In step 408, gateway 120a receives an active pilot channel SNR measurement from a user terminal 124a. Gateway 120a transmits pilot channel signals at constant power. Therefore, this received SNR estimate provides a frame of reference for determining transmit power levels for forward link traffic channels. Accordingly, from this received SNR, gateway 120a determines a baseline power level, $P_{baseline}$, in step 410. This determination is described in greater detail below with reference to FIG. 5.

In a step 404, gateway 120a performs an interference based power control. Step 404 includes steps 412 and 414. In step 412, gateway 120a identifies a susceptibility of user terminal 124a to interfering transmissions that involve other user terminals 124. Although such interfering transmissions are difficult to predict and can have fluctuating levels, the operational environment of user terminal 124a determines the interference susceptibility of user terminal 124a. This determination is described in greater detail below with reference to FIG. 6.

The interference susceptibility of user terminal 124a corresponds to a range of possible interference power levels. From this determined interference susceptibility, gateway 120a determines a corresponding power margin, $P_{margin}$, in step 414.

In a step 406, gateway 120a performs an error rate based power control. As shown in FIG. 4, step 406 includes steps 416 and 418. In step 416, gateway 120a identifies a forward link error rate, such as a packet error rate (PER). In step 418, gateway 120a determines a power level correction, $P_{correction}$, from the identified error rate.

In a step 420, gateway 120a sends forward link traffic channel transmissions to user 124a having a transmit power, $P_{transmit}$, that is based on $P_{baseline}$, $P_{margin}$, and $P_{correction}$ according to a relationship, such as the one expressed below in Equation (2).

$$P_{transmit} = P_{baseline} + P_{margin} + P_{correction} \quad (2)$$

As described above, a forward link traffic channel's error rates depend on its SNR. $P_{baseline}$, $P_{margin}$, and $P_{correction}$ are each determined in steps 402, 404, and 406 to maintain forward link traffic channel error rates, such as bit error rate (BER) and packet error rate (PER), within specific requirements. The requirements may be selected as desired, and alternatively may be dynamically adjusted over time.

III. Noise Based Power Control

As described above with reference to FIG. 4, $P_{baseline}$ is determined by gateway 120a in step 410. Gateway 120a adjusts $P_{baseline}$ so that, in the absence of interference from other RF energy sources, forward link information error rates are maintained within specified requirements. $P_{baseline}$ is determined from SNR measurements taken by user terminal 124a that characterize the reception quality of active beam pilot channel signals.

As shown in FIG. 1, gateway 120a communicates with user terminal 124a through satellite 116a. Satellite 116a supports communications across a footprint that includes a plurality of beams, such as beams 204. Gateway 120a transmits a plurality of forward link pilot channel signals. Each of these pilot channel signals is relayed by satellite 116a in a respective one of the plurality of beams.

These pilot channel signals employ time-based offsets of a given PN code sequence. Furthermore, gateway 120a transmits these pilot signals at a substantially constant power.

User terminal 124a is serviced by one of the plurality of beams of satellite 116a. This beam is referred to herein as the active beam of user terminal 124a. User terminal 124a measures an active beam pilot signal SNR and transmits the results of this measurement to gateway 120a. This transmitted measurement may be in the form of a message that user terminal 124a periodically sends to gateway 120a.

Since forward link pilot channel signals are transmitted at a constant power, these SNR measurements transmitted by user terminal 124a provide gateway 120a with a frame of reference for determining adequate forward link traffic channel transmit power levels in the absence of interference.

The active pilot channel SNR measurements received from user terminal 124a are each expressed herein as $E_{cp}/N_t$, where $E_{cp}$ represents the energy per pilot signal chip. As described above, gateway 120a receives $E_{cp}/N_t$ in step 408. From $E_{cp}/N_t$, gateway 120a determines a power level for $P_{baseline}$. In the absence of interference, forward link traffic channel signals transmitted at $P_{baseline}$ will be within specified error rate limits when received by user terminal 124a.

Figure 5:
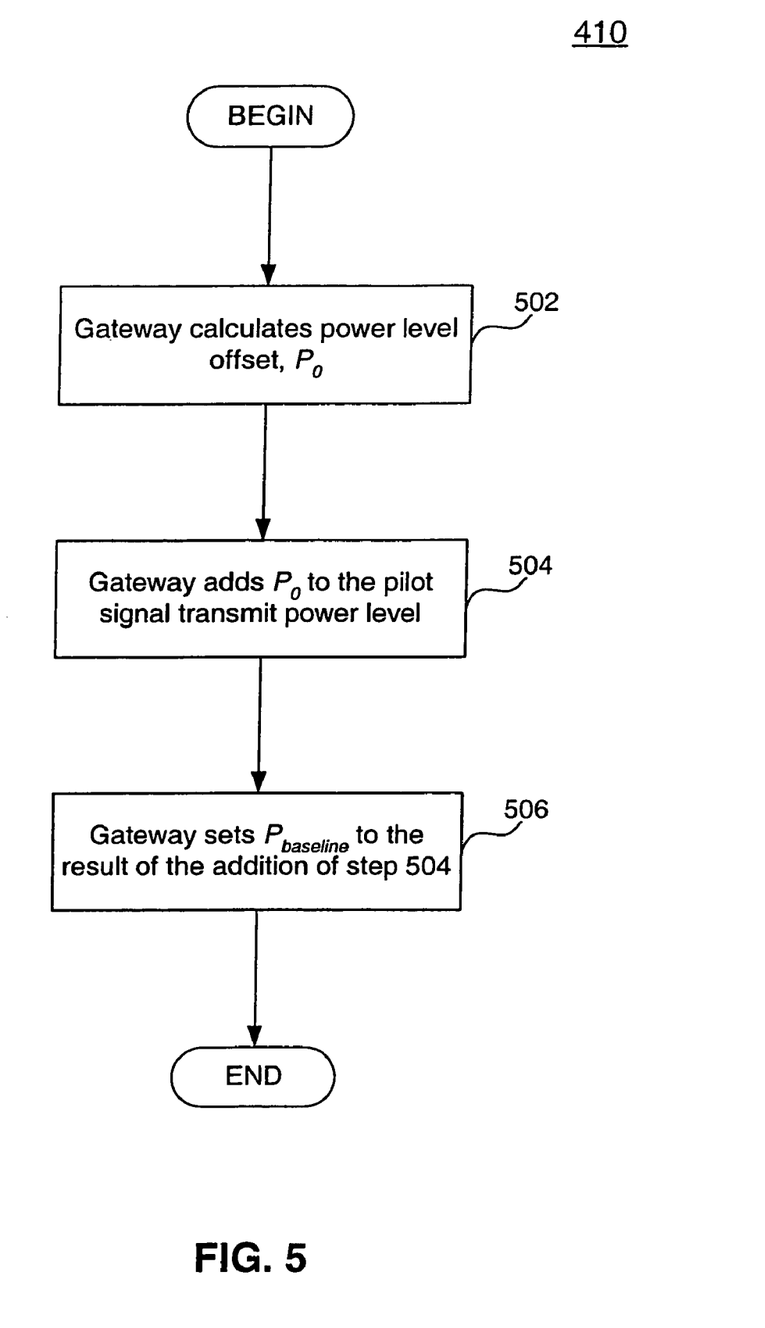

FIG. 5 is a flowchart illustrating a performance of step 410 in greater detail. This performance begins with a step 502, where gateway 120a calculates a power level offset, $P_o$, according to the relationship (3) below.

$$P_o = E_{bt}/N_t + 10\log(R/W) - E_{cp}/N_t \quad (3)$$

In Equation (3), $E_{bt}/N_t$ is a desired forward link traffic channel SNR in decibels (dB), R is the forward link traffic channel data rate, W is the forward link traffic channel spreading bandwidth, $E_{cp}/N_t$ is the received active pilot channel SNR measurement in dB and R/W is the processing gain. $E_{bt}/N_t$ is selected to achieve a desired BER for forward link traffic channel transmissions to user terminal 124a.

A step 504 follows step 502. In step 504, gateway 124a adds $P_o$ to the power level used to transmit pilot channel signals to user terminal 124a. Next, in a step 506, gateway 120a sets $P_{baseline}$ to the result of the addition performed in step 504.

Two examples of these steps are now described in the context of Equation (3). For both of these examples, the desired forward link traffic channel SNR ($E_{bt}/N_t$) is 1 dB. In the first example, R=6.048 kbps and W=1.2288 MHz. If gateway 120a receives from user terminal 124a an $E_{cp}/N_t$ value of −21 dB, then $P_o$ is approximately −1 dB. Thus, in this example, gateway 120a sets $P_{baseline}$ at 1 dB less than the corresponding pilot channel transmit power.

In the second example, R=9.6 kbps and W=1.2288 MHz. If gateway 120a receives from user terminal 124a an $E_{cp}/N_t$ value of −21 dB, then $P_o$ is approximately 1 dB. Thus, in this example, gateway 120a sets $P_{baseline}$ at 1 dB greater than the corresponding pilot channel transmit power. These two examples illustrate that, as data rates increase, so does the differential between pilot transmit power and traffic transmit power.

IV. Interference Based Power Control

As described with reference to the operational scenario of FIG. 3, the signal strength of transmission 302" is stronger than transmission 302'. Accordingly, within the scenario of FIG. 3, the reception of transmission 306 by user terminal 124e is susceptible to a greater amount of interference than is the reception of transmission 304 by user terminal 124d. Gateway 120a applies this principle in step 404 to reduce such interference while conserving transmit power.

Forward link traffic channel signals that are directed to other user terminals 124 in different beams may interfere with traffic channel signals directed to user terminal 124a. As described above with reference to Equation (1), interference power levels (expressed as $I_t$) may vary greatly. Such variations cause the forward link traffic channel SNR, as well as the associated error rates, to fluctuate over a large range of values.

The reason for such fluctuations is described with reference to Equation (4), below. Equation (4) expresses the interference noise component, $I_{t,i}$, that a user, i, receives from the forward link traffic channel transmissions of a set of interfering users (indexed by the variable j).

$$I_{t,i} = \sum_{j \neq i} \frac{P_j \cdot R_j}{W} \quad (4)$$

In Equation (4), $P_j$ is the forward link transmit power directed to a user, j, $R_j$ is the data rate of the forward link power to user j, and W is the CDMA spreading bandwidth.

As expressed in Equation (4), the contribution of an interfering user terminal 124 to the forward link interference noise component of user terminal 124a is directly proportional to the interfering user terminal's forward link data rate, $R_j$. In accordance with the relationship of Equation (1), as forward link data rates increase, the interference noise component, $I_t$, of $N_t$ becomes progressively dominant over the corresponding thermal noise component, $N_0$.

As described herein with reference to FIG. 1, WCS 100 may offer both LDR and HDR services. Because of its substantially lower data rate, interference noise variations from LDR links are relatively small when compared to interference noise variations from HDR links that transfer bursty traffic at higher data rates.

To make sure that such interference variations do not compromise communications across or over wireless links, gateway 120a includes $P_{margin}$ as a forward link traffic channel transmit power component. $P_{margin}$ mitigates interference from adjacent beam forward link traffic channels.

As described above with reference to the operational scenario of FIG. 3, the location of a user terminal 124 within a beam affects its susceptibility to interference. More specifically, a user terminal 124 near the interface between two beams, such as a user terminal 124 in crossover region 208, is likely to receive more interference than a user terminal 124 further away from beam interfaces, such as a user terminal 124 in central region 206. Therefore, to mitigate interference, gateway 120a may employ a smaller $P_{margin}$ when user terminal 124a is in a central region than when user terminal 124a is in a crossover region.

Figure 6:
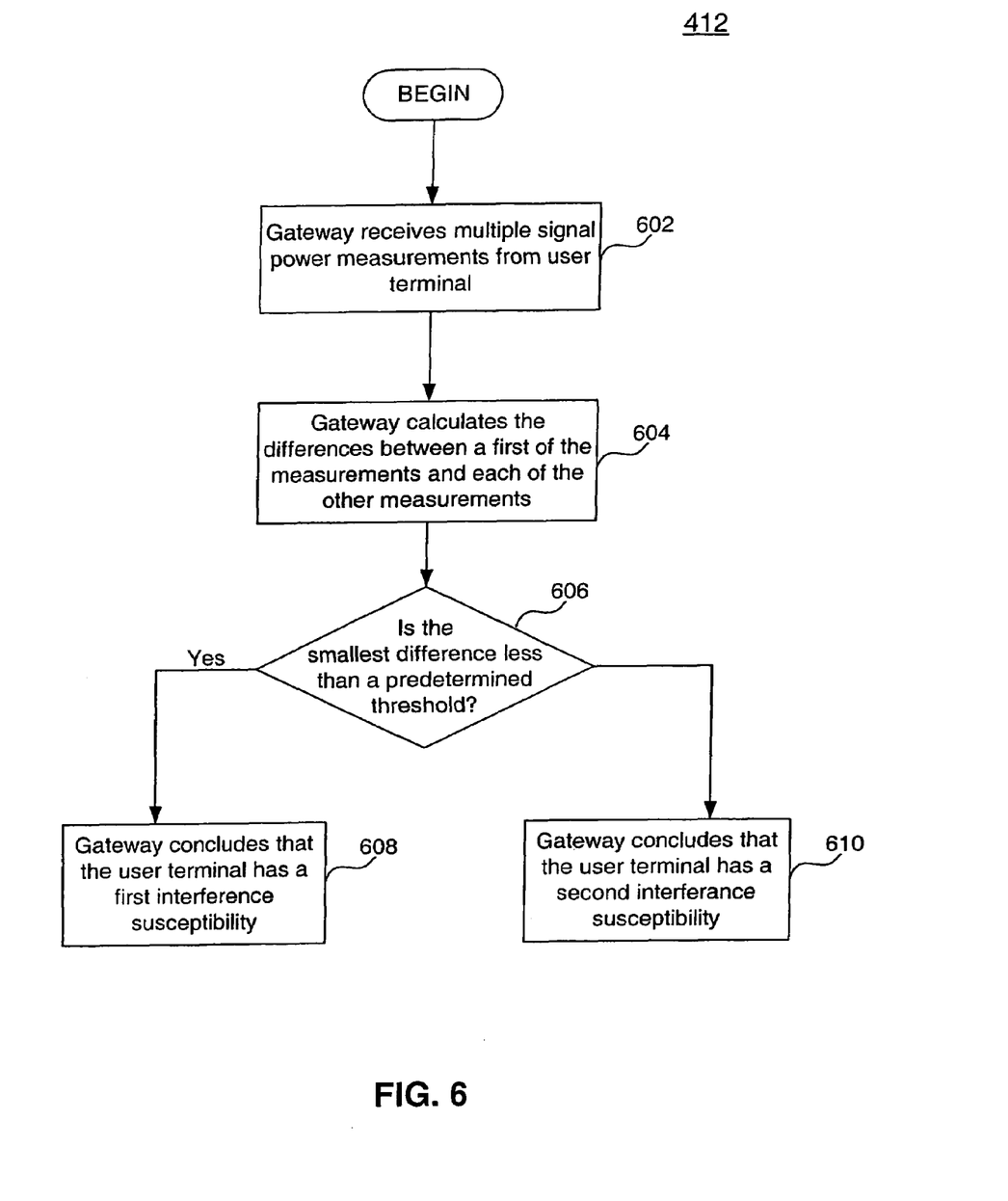

Accordingly, gateway 120a determines $P_{margin}$ based on the location of user terminal 124a within its active beam 204. As described above with reference to FIG. 4, $P_{margin}$ is determined by gateway 120 in step 414. Accordingly, step 414 may comprise setting $P_{margin}$ to a first power level when the identified location is within a beam crossover region, and setting $P_{margin}$ to a second power level when the identified location is within a beam central region. Since user terminals 124 within beam crossover regions are more susceptible to interference, the first power level in this example is greater than the second power level. FIG. 6 is a flowchart that illustrates a performance of step 412 that implements this position-based feature. This performance begins with a step 602, where gateway 120a receives a plurality of signal power measurements from user terminal 124a. Each of these power measurements corresponds to one of a plurality of beams. For example, each of these measurements may be pilot signal power measurements. These measurements may be in the form of a formatted message, such as a pilot strength measurement message (PSMM).

Next, in a step 604, gateway 120a calculates the differences between a first of the signal power measurements and each of the other signal power measurements. This first power measurement may be of the active beam pilot signal power or the largest power measurement. In this case, the smallest of these differences indicates the ability of user terminal 124a to receive forward link transmissions, such as interfering forward link traffic channel transmissions, from another beam. Accordingly, the smallest of these differences indicates the interference susceptibility of user terminal 124a.

In a step 606, gateway 120a determines whether the smallest of the differences calculated in step 604 is greater than a predetermined threshold. If so, then a step 608 is performed, where gateway 120a concludes that user terminal 124a has a first interference susceptibility. Otherwise, a step 610 is performed, where gateway 120a concludes that user terminal 124a has second interference susceptibility, which is greater than the first interference susceptibility.

From this identified interference susceptibility, gateway 120a determines a corresponding $P_{margin}$ value, as described above with reference to step 414 of FIG. 4. In particular, gateway 120a determines a $P_{margin}$ according to a relationship where $P_{margin}$ increases as the interference susceptibility identified in step 412 increases.

For instance, as described above with reference to FIG. 6, gateway 120a determines the interference susceptibility of user terminal 124a. Namely, gateway 120a identifies a higher interference susceptibility in step 608 than in step 610. Thus, gateway 120a sets $P_{margin}$ to a greater value when step 414 follows step 608 than when step 414 follows step 610.

V. Error Rate Based Power Control

As described above with reference to FIGS. 5 and 6, $P_{baseline}$ and $P_{margin}$ are determined in response to SNR and power measurements. For instance, gateway 120a determines $P_{baseline}$ in step 410 in response to active pilot channel SNR measurements so that a desired forward link traffic channel SNR (expressed in Equation (3) as Ebt/Nt) is achieved. This desired SNR corresponds to target error rate(s) based on a relationship that is determined by the modulation scheme and error correction coding techniques employed by gateway 120a in forward link traffic channel transmissions.

Similarly, in step 414 gateway 120a determines $P_{margin}$ according to a comparison of pilot signal power measurements received from user terminal 124a that identifies interference susceptibility. However, this identified interference susceptibility does not indicate actual interference received by user terminal 124a.

In contrast to $P_{baseline}$ and $P_{margin}$, $P_{correction}$ is determined by gateway 120a in step 418 from actual forward link error rates that user terminal 124a encounters. As described above with reference to FIG. 4, gateway 120a identifies a forward link error rate, such as PER, in step 416.

Gateway 120a sends information across the forward link traffic channel to user terminal 124a in the form of packets. Each of these packets is marked with a sequence identification number (sequence ID) that is assigned in a predetermined manner. User terminal 124a monitors the sequence IDs of received packets and sends a message to gateway 120a when packets are received out of sequence.

This message, referred to herein as a negative acknowledgement (NAK) message, indicates a sequence ID that was missing in a series of packets that user terminal 124a received from gateway 120a. A missing sequence ID indicates a packet error. Gateway 120a collects statistics on the number of NAK messages received from user terminal 124a to compute the forward link traffic channel PER in step 416.

Accordingly, step 416 includes gateway 120a counting the number of negative acknowledgement (NAK) messages received over a data collection interval. In addition, step 416 includes gateway 120a calculating a PER according to a relationship, such as the one expressed below in Equation (5).

$$PER = \frac{\text{Number of received } NAK \text{ messages}}{\text{Number of transmitted packets}} \quad (5)$$

In Equation (5), gateway 120a divides the number of NAK messages received during the data collection interval by the number of packets that gateway 120a transmitted during the data collection interval.

An alternative way to calculate a PER involves user terminal 124a receiving packets containing cyclical redundancy check (CRC) bits. For each packet, user terminal 124a uses these CRC bits to determine whether the packet contains bit errors. If so, then user terminal 124a increments a packet error counter. User terminal 124a may determine a PER by calculating the ratio of counted packet errors to received errors. This PER may periodically transmit such calculated PERs to gateway 120a. In addition, other known methods of calculating a PER may be used within the embodiments without departing from the scope of the invention.

As described above with reference to FIG. 4, gateway 120a determines in step 418 a power level correction component, $P_{correction}$, from the identified error rate. Step 418 comprises comparing the PER identified in step 416 with a desired PER, and adjusting $P_{correction}$ accordingly. In particular, this adjustment comprises gateway 120a increasing $P_{correction}$ when the identified PER is greater than the desired PER, and gateway 120a decreasing $P_{correction}$ when the identified PER is less than the desired PER.

VI. Timing

As shown in FIG. 4, steps 402, 404, and 406 may be performed sequentially. However, these steps may also be performed independently of each other. As described above, steps 402, 404, and 406 each involve receiving information from user terminal 124a. In response to this information, these steps each set a corresponding transmit power component.

As described above, noise based power control is performed in step 402. This power control involves gateway 120a receiving SNR measurements, such as $E_{cp}/N_t$, from user terminal 124a, and in response setting $P_{baseline}$. User terminal 124a may periodically transmit these SNR measurements, such as once every second. Therefore, gateway 120a may periodically set $P_{baseline}$.

Interference based power control is performed in step 404. Changes in interference susceptibility often change more slowly than changes in a user terminal's noise environment because interference based changes are due to slower geometry changes that are caused by satellite motion and/or user terminal motion. Therefore, step 404 may involve gateway 120a receiving a set of pilot signal power measurements. These measurements may be in the form of a PSMM, which is also transmitted periodically, such as once every 10 seconds. Accordingly, gateway 120a may periodically adjust $P_{margin}$.

Gateway 120a performs error rate based power control in step 406. As described above, this power control involves the receipt of NAK messages over a data collection interval. This data collection interval may have various durations, as desired, as would be known. More reliable PER statistics are gathered when longer data collection intervals are employed. Therefore, gateway 120a may periodically adjust $P_{correction}$ once every data collection interval. An exemplary data collection interval is 60 seconds.

VII. Exemplary Gateway Implementation

Figure 7:
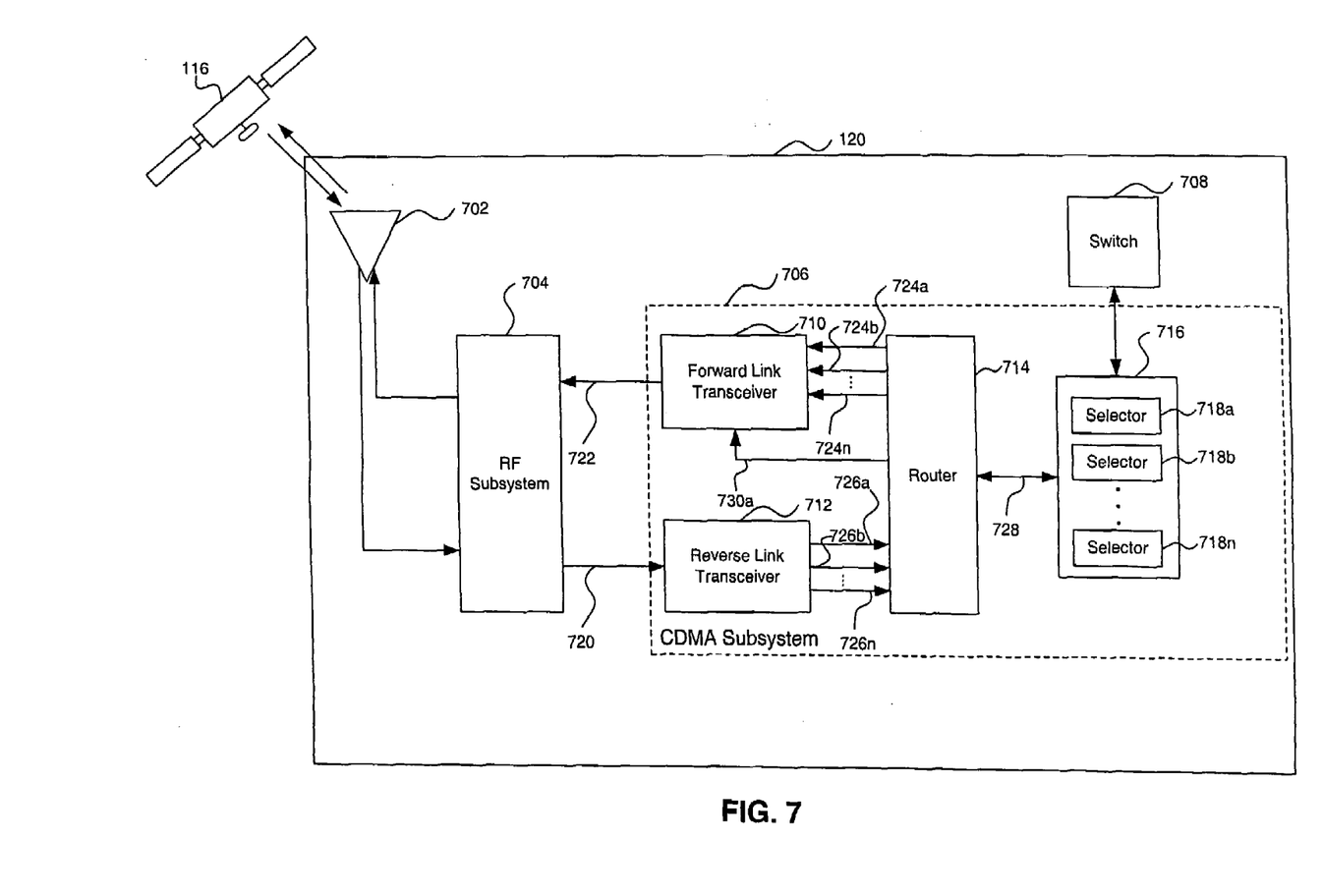
FIG. 7 is a block diagram of an exemplary gateway implementation.

FIG. 7 is a block diagram of an exemplary gateway 120 implementation that performs the techniques described herein. Although described in the context of satellite communications, this exemplary implementation may also be employed in cellular base stations, such as base station 112 of FIG. 1. As shown in FIG. 7, this implementation includes an antenna segment 702 that is coupled to a radio frequency (RF) subsystem 704, and a CDMA subsystem 706 that is coupled to RF subsystem 704. In addition, gateway 120 further includes a switch 708 that is coupled to CDMA subsystem 706.

Antenna segment 702 includes one or more antennas that exchange RF signals with one or more user terminals 124 through satellite(s) 116. In particular, antenna segment 702 receives reverse link RF signals and transmits forward link RF signals. To enable the transmission and reception of RF signals through a single antenna, antenna segment 702 may also include a diplexer (not shown).

RF subsystem 704 receives electrical signals from antenna segment 702 within an RF frequency band. Upon reception, RF subsystem 704 down converts these electrical signals from the RF frequency band to an intermediate frequency (IF). In addition, RF subsystem 704 may filter the electrical signals received from antenna segment 702 in accordance with a predetermined bandwidth.

To increase the power of the RF signals received from antenna segment 702, RF subsystem 704 also includes amplification components (not shown). Exemplary amplification components include a low noise amplifier (LNA) that initially amplifies signals received from antenna segment 702, and a variable gain amplifier (VGA) that further amplifies these signals after they are mixed down to IF during the aforementioned down conversion process.

As a result of these filtering, down conversion, and amplification operations, RF subsystem 204 produces an IF signal 720 that is sent to a reverse link transceiver 712 within CDMA subsystem 706.

In addition to receiving reverse link RF signals from antenna segment 702, RF subsystem 704 receives a forward link IF signal 722 from a forward link transceiver 710 within CDMA subsystem 706. RF subsystem 704 amplifies and up converts this signal into a corresponding RF signal for transmission by antenna segment 702.

As shown in FIG. 7, CDMA subsystem 706 includes a forward link transceiver 710, a reverse link transceiver 712, a router 714, and a selector bank subsystem (SBS) 716. As described above, transceivers 710 and 712 exchange IF signals 720 and 722 with RF subsystem 704. In addition, transceivers 710 and 712 perform CDMA operations.

In particular, forward link transceiver 710 receives one or more forward link information sequences 724 from router 714. Upon reception, forward link transceiver 710 converts these sequences into IF signal 722, which is in a CDMA transmission format. This conversion is described in greater detail below with reference to FIG. 8.

Reverse link transceiver 712 converts IF signal 720, which is in a CDMA transmission format, into information sequences 726a-726n. For example, forward link transceiver 710 despreads and decovers IF signal 720 with one or more PN sequences and channelizing codes. In addition, forward link transceiver 710 may perform decoding and de-interleaving operations to produce information sequences 726, which are sent to router 714.

Router 714 handles the transfer of information sequences 724 and 726, which may be in the form of packets, between SBS 716 and transceivers 710 and 712. This transfer is performed across interface 728, which may be a data network, such as a local area network (LAN), or any other well known mechanism for transferring information.

SBS 716 processes the forward link and reverse link traffic handled by gateway 120. This traffic includes both payload traffic and signaling traffic. For example, SBS 716 exchanges signaling traffic in the performance of call processing operations, such as call setup, call teardown, and beam hand-offs. SBS 716 also forwards traffic to switch 708, which provides an interface to a public switched telephone network (PSTN).

SBS 716 includes a plurality of selectors 718a-n for processing forward and reverse link traffic. Each selector 718 handles active communications for a corresponding user terminal 124. However, selectors 718 may be reassigned to other user terminals 124 upon the termination of such active communications. For example, selectors 718 evaluate PSMMs, pilot signal SNR measurements, and NAK messages sent from user terminals 124 to perform appropriate forward link traffic channel transmit power adjustments.

Each selector 718 may be implemented in a software-controlled processor programmed to perform the functions described herein. Such implementations may include well known standard elements or generalized function or general purpose hardware including a variety of digital signal processors (DSPs), programmable electronic devices, or computers that operate under the control of software instructions perform the desired functions.

Each selector 718 controls forward link power control operations. To adjust the power of forward link transmissions, selectors 718 each send a power control command 730 to forward link transceiver 710. Power control commands 730 each designate a forward link transmit power. In response to these commands, forward link transceiver 710 sets the transmit power for the forward links controlled by the selectors 718 originating these commands.

For example, selector 718a generates a power control command 730a that is sent to transceiver 710 through interface 728 and router 714. Upon receipt of power control command 730a, forward link transceiver 710 sets the power of the forward link controlled by selector 718a. Details regarding this feature are described below with reference to FIG. 8.

Accordingly, each selector 718 operates with forward link transceiver 710 to perform the steps described above with reference to FIGS. 4-6. For example, as described above with reference to steps 402, 404, and 406, each selector 718 determines $P_{baseline}$, $P_{margin}$, and $P_{correction}$.

Additionally, each selector 718 operates with forward link transceiver 710 to set the corresponding $P_{transmit}$ based on $P_{baseline}$, $P_{margin}$, and $P_{correction}$. Thus, these components perform step 420.

Figure 8:
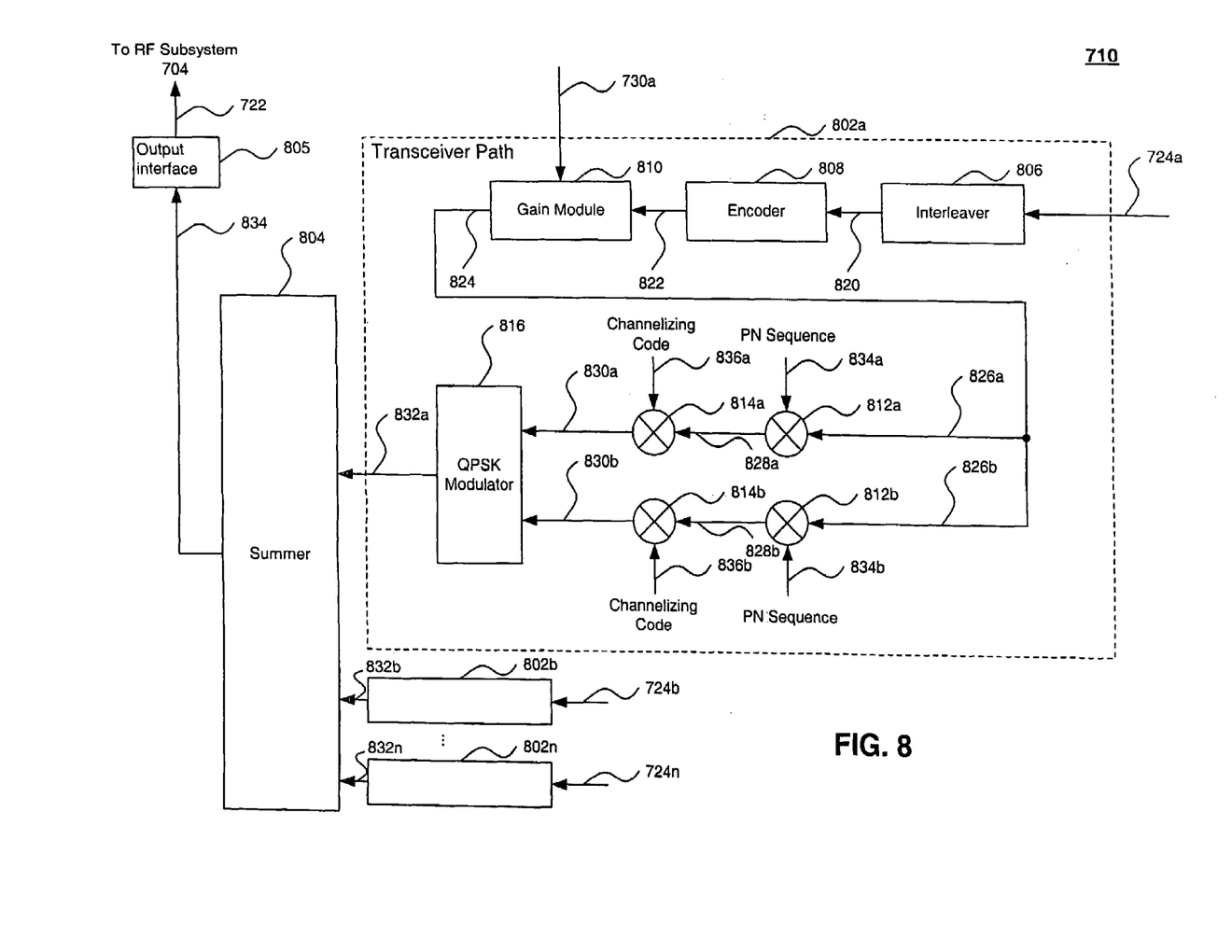
FIG. 8 is a block diagram of a forward link transceiver implementation.

FIG. 8 is a block diagram of a forward link transceiver 710 implementation. As shown in FIG. 8, transceiver 710 includes a plurality of transceiver paths 802a-802n, a summer 804, and an output interface 805. Each transceiver path 802 receives a forward link information sequence 724 and a power control command 730 from a corresponding selector 718. Although FIG. 8 only shows implementation details for transceiver path 802a, transceiver paths 802b-802n may include similar or identical features.

As shown in FIG. 8, transceiver path 802a includes an interleaver 806, an encoder 808, and a gain module 810. Interleaver 806 receives an information sequence 724 and block interleaves this sequence to produce an interleaved sequence 820.

Interleaved sequence 820 is sent to encoder 808, which performs error correction encoding, such as turbo block encoding, to produce an encoded information sequence 822.

Gain module 810 receives encoded sequence 822, which is a forward link information sequence. Additionally, gain module 810 receives power control command 730a from selector 718a. Gain module 810 scales encoded sequence 822 based on the transmit power level designated by power control command 730a. Thus, gain module 810 may increase or decrease the power of encoded sequence 822. This scaling produces a scaled sequence 824.

Encoded sequence 822 is a sequence of digital symbols. This sequence may be scaled by multiplying each of the symbols with a gain factor determined by power control command 730. Such scaling operations may be implemented digitally through hardware techniques, and/or software instructions operating on well known elements or generalized function or general purpose hardware including a variety of programmable electronic devices, or computers that operate under the control of commands, firmware, or software instructions to perform the desired functions. Examples include a software-controlled processor, controller or device, a microprocessor, one or more digital signal processors (DSP), dedicated function circuit modules, application specific integrated circuits (ASIC), and field programmable gate arrays (FPGA). Accordingly, power control command 730a may include one or more software instructions transferred between selector 718a and gain module 810.

As shown in FIG. 8, transceiver path 802 further includes spreading combiners 812a-812b, channelizing combiners 814a-814b, and a quadrature phase shift keying (QPSK) modulator 816. Spreading combiners 812a-812b each receive scaled sequence 824 and combine (for example, multiply) this sequence with a respective PN sequence 834 to produce spread sequences 828a and 828b.

Spread sequences 828a and 828b are each transferred to a respective channelizing combiner 814. Each channelizing combiner 814 combines (for example, multiplies) the corresponding spread sequence 828 with a channelzing code, such as a Walsh code. As a result, combiners 814 each produce a channelized sequence 830. In particular, combiner 814a produces an in-phase (I) channelized sequence 830a and combiner 814b produces a quadrature (Q) channelized sequence 830b.

Channelized sequences 830a and 830b are sent to QPSK modulator 816. QPSK modulator 816 modulates these sequences to generate a modulated waveform 832a. Modulated waveform 832a is sent to summer 804. Summer 804 adds modulated waveform 832a and waveforms 832b-832n produced by transceiver paths 802b-802n. This operation results in a combined signal 834, which is sent to output interface 805.

Output interface 805 up converts combined signal 834 from baseband to an IF, thereby generating forward link IF signal 722. Output interface 805 may additionally perform filtering and amplification operations in the generation of IF signal 722.

VIII. Conclusion

While various embodiments have been described above, it should be understood that they have been presented by way of example only, and not limitation. For example, the present invention is not limited to satellite-based communications systems, but also may be applied to terrestrial-based systems, such as where there are multiple sectors (beams) and cross-over regions between such sectors. Furthermore, the present invention is not limited to CDMA systems, but may be extended to other types of communications systems and air interfaces, such TDMA, FDMA, CDMA2000, and WCDMA systems. Moreover, while the embodiments describe wireless CDMA transmission in the context of QPSK modulation, other modulation techniques may employed.

It will be understood by those skilled in the art that various changes in form and details may be made therein without departing from the spirit and scope of the invention as defined in the claims.

We claim:

1. A method of controlling forward link traffic channel transmission power, $P_{transmit}$, to a user terminal in a wireless communications system having a plurality of beams, comprising the steps of:
    (a) receiving from the user terminal an active pilot channel signal to noise ratio (SNR);
    (b) determining a baseline power level, $P_{baseline}$, from the received active pilot channel SNR, wherein the determining step comprises calculating a power level offset, $P_o$, according to $P_o=E_{bt}/N_t+10\log(R/W)-E_{cp}/N_t$, wherein $E_{bt}/N_t$ is a desired forward link traffic channel SNR in decibels (dB), R is a forward link traffic channel data rate, W is a spreading bandwidth, and $E_{cp}/N_t$ is the received active pilot channel SNR in dB and adding $P_o$ to a pilot channel transmit power level;
    (c) identifying a user terminal interference susceptibility;
    (d) determining a power margin, $P_{margin}$ from the identified interference susceptibility;
    (e) identifying a packet error rate (PER) associated with the user terminal;
    (f) determining a power level correction, $P_{correction}$, based on the PER; and
    (g) setting $P_{transmit}$ based on $P_{baseline}$, $P_{margin}$, and $P_{correction}$.

2. The method of claim 1, wherein step (c) comprises:
    (1) receiving from the user terminal a plurality of signal power measurements, wherein each of the signal power measurements corresponds to one of a plurality of beams; and
    (2) calculating the differences between a first of the signal power measurements and each of the other signal power measurements.

3. The method of claim 2, wherein step (1) comprises receiving a pilot strength measurement message (PSMM).

4. The method of claim 2, wherein step (d) comprises:
    (1) setting $P_{margin}$ to a first power level when the smallest of the calculated differences is greater than a predetermined threshold; and
    (2) setting $P_{margin}$ to a second power level when the smallest of the calculated differences is less than or equal to the predetermined threshold;
    wherein the first power level is less than the second power level.

5. The method of claim 2, wherein step (d) comprises setting $P_{margin}$ as a function of the smallest of the calculated differences.

6. The method of claim 1, wherein step (c) comprises determining a location of the user terminal within one of the pluralty of beams.

7. The method of claim 6, wherein step (d) comprises:
    (1) setting $P_{margin}$ to a first power level when the determined location is within a beam crossover region; and
    (2) setting $P_{margin}$ to a second power level when the determined location is within a beam central region;
    wherein the first power level is greater than the second power level.

8. The method of claim 1, wherein step (e) comprises;
    (1) determining a number of negative acknowledgement (NAK) messages received over a data collection interval;
    (2) determining a number of packets transmitted to the user terminal over the data collection interval; and
    (3) calculating the packet error rate from the determined number of NAK messages and the determined number of transmitted packets.

9. The method of claim 1, wherein step (e) comprises:
    (1) determining from a cyclical redundancy check whether a packet contains bit errors;
    (2) incrementing a packet error counter when it is determined a packet contains errors; and
    (3) calculating the ratio of counted packet errors to received errors.

10. The method of claim 1, wherein step (g) comprises setting $P_{transmit}$ to a power level that is substantially equal to the sum of $P_{baseline}$, $P_{margin}$, and $P_{correction}$.

11. The method of claim 1, wherein step (f) compnses:
    (1) increasing $P_{correction}$ when the identified PER is greater than a desired PER; and
    (2) decreasing $P_{correction}$ when the identified PER is less than the desired PER.

12. A system for controlling forward link traffic channel transmission power, $P_{transmit}$, to a user terminal in a wireless communications system having a plurality of beams, comprising:
    a selector for determining a baseline power level, $P_{baseline}$, from a received active pilot channel SNR, a power margin, $P_{margin}$, from an identified interference susceptibility, and a power level correction, $P_{correction}$, from an identified packet error rate (PER), wherein the base line power level, $P_{baseline}$, comprises a power level offset, $P_o$, according to $P_o=E_{bt}/N_t+10\log(R/W)-E_{cp}/N_t$, wherein $E_{bt}/N_t$ is a desired forward link traffic channel SNR in decibels (dB), R is a forward link traffic channel data rate, W is a spreading bandwidth, and $E_{cp}/N_t$ is the received active pilot channel SNR in dB; and
    means for adding $P_o$ to a pilot channel transmit power level; and
    a transceiver for setting the forward link transmission power, $P_{transmit}$, based on $P_{baseline}$, $P_{margin}$, and $P_{correction}$.

13. The system of claim 12, wherein, said transceiver further comprises setting $P_{transmit}$ to a power level that is substantially equal to the sum of $P_{baseline}$, $P_{margin}$, and $P_{correction}$.

14. A system for controlling forward link traffic channel transmission power, $P_{transmit}$, to a user terminal in a wireless communications system having a plurality of beams, comprising:
    means for receiving from the user terminal an active pilot channel signal to noise ratio (SNR);

means for determining a baseline power level, $P_{baseline}$, from the received active pilot channel SNR, wherein said means for determining a baseline power level comprises a means for calculating a power level offset, $P_o$ according to $P_o = E_{bt}/N_t + 10 \log(R/W) - E_{cp}/N_t$, wherein $E_{bt}/N_t$ is a desired forward link traffic channel SNR in decibels (dB) R is a forward link traffic channel data rate, W is a spreading bandwidth, and $E_{cp}/N_t$ is the received active pilot channel SNR in dB and a means for adding $P_o$ to a pilot channel transmit power level;

means for identifying a user terminal interference susceptibility;

means for determining a power margin, $P_{margin}$, from the identified interference susceptibility;

means for identifying a packet error rate (PER) associated with the user terminal;

means for determining a power level correction, $P_{correction}$, based on the PER; and means for setting $P_{transmit}$ based on $P_{baseline}$, $P_{margin}$, and $P_{correction}$.

15. The system of claim 14, wherein said means for identifying a user terminal interference susceptibility comprises:

means for receiving from the user terminal a plurality of signal power measurements, wherein each of the signal power measurements corresponds to one of a plurality of beams; and means for calculating the differences between a first of the signal power measurements and each of the other signal power measurements.

16. The system of claim 15, wherein said means for receiving from the user terminal a plurality of signal power measurements comprises means for receiving a pilot strength measurement message (PSMM).

17. The system of claim 15, wherein said means for determining $P_{margin}$ comprises:

means for setting $P_{margin}$ to a first power level when the smallest of the calculated differences is greater than a predetermined threshold; and means for setting $P_{margin}$ to a second power level when the smallest of the calculated differences is less than or equal to the predetermined threshold;

wherein the first power level is less than the second power level.

18. The system of claim 15, wherein said means for determining $P_{margin}$ comprises means for setting $P_{margin}$ as a function of the smallest of the calculated differences.

19. The system of claim 14, wherein said means for identifying a user terminal interference susceptibility comprises means for determining the location of the user terminal within one of the plurality of beams.

20. The system of claim 19, wherein said means for determining $P_{margin}$ comprises:

means for setting $P_{margin}$ to a first power level when the identified location is within a beam crossover region; and means for setting $P_{margin}$ to a second power level when the identified location is within a beam central region;

wherein the first power level is greater than the second power level.

21. The system of claim 14, wherein said means for identifying a PER comprises:

means for determining the number of negative acknowledgement (NAK) messages received over a data collection interval;

means for deterimining the number of packets transmitted to the user terminal over the data collection interval; and means for calculating the packet error rate from the determined number of NAK messages and the determined number of transmitted packets.

22. The system of claim 14, wherein said means for setting $P_{transmit}$ comprises means for setting the forward link traffic channel transmission power to a power level that is equal to the sum of $P_{baseline}$, $P_{margin}$, and $P_{correction}$.

23. The system of claim 14, wherein said means for determining $P_{correction}$ comprises:

means for increasing $P_{correction}$ when the identified PER is greater than a desired PER; and means for decreasing $P_{correction}$ when the identified PER is less than the desired PER.

24. The system of claim 14, wherein said means for identifying a packet error rate (PER) comprises:

(1) means for determining from a cyclical redundancy check whether a packet contains hit errors:

(2) means tbr incrernentina a packet error counter when it is determined a packet contains errors: and (3) means for ealculatina the ratio of counted packet errors to received errors.

* * * * *